United States Patent
Schwemler et al.

(10) Patent No.: US 8,034,269 B2
(45) Date of Patent: Oct. 11, 2011

(54) PROCESS FOR THE COMPOUNDING OF POLYMERS

(75) Inventors: Christoph Schwemler, Leichlingen (DE); Martin Lüdeke, Krefeld (DE); Christian Kords, Krefeld (DE); Reiner Rudolf, Leverkusen (DE)

(73) Assignee: Bayer Material Science, Leverkusen (DE)

( * ) Notice: Subject to any disclaimer, the term of this patent is extended or adjusted under 35 U.S.C. 154(b) by 254 days.

(21) Appl. No.: 11/895,482

(22) Filed: Aug. 24, 2007

(65) Prior Publication Data

US 2008/0067711 A1 Mar. 20, 2008

(30) Foreign Application Priority Data

Aug. 26, 2006 (DE) .......................... 10 2006 040 058
Jun. 23, 2007 (DE) .......................... 10 2007 029 010

(51) Int. Cl.
- B29C 47/76 (2006.01)
- B29C 47/60 (2006.01)
- B29C 47/00 (2006.01)
- D01F 1/02 (2006.01)

(52) U.S. Cl. ...... 264/102; 264/85; 264/211; 264/211.23

(58) Field of Classification Search .................. None
See application file for complete search history.

(56) References Cited

U.S. PATENT DOCUMENTS

| | | | | |
|---|---|---|---|---|
| 3,267,075 A * | 8/1966 | Schnell et al. | ................. | 528/495 |
| 3,917,507 A * | 11/1975 | Skidmore | ........................ | 159/2.2 |
| 4,065,532 A * | 12/1977 | Wild et al. | ........................ | 264/68 |
| 4,127,635 A * | 11/1978 | Gauthier | ........................ | 264/102 |
| 4,703,105 A * | 10/1987 | Allada | ........................... | 528/483 |
| 4,746,482 A * | 5/1988 | Ribbing et al. | ................ | 264/102 |
| 4,992,222 A * | 2/1991 | Banevicius et al. | ........... | 264/45.9 |
| 5,039,742 A * | 8/1991 | Brown et al. | ..................... | 525/68 |
| 5,043,421 A * | 8/1991 | Golba et al. | ................... | 528/495 |
| 5,102,591 A * | 4/1992 | Hasson et al. | ................ | 264/45.9 |
| 5,281,379 A * | 1/1994 | Noguchi et al. | ............... | 264/102 |
| 5,442,041 A * | 8/1995 | Mallikarjun et al. | ......... | 528/483 |
| 5,777,064 A * | 7/1998 | Hayashi et al. | ................ | 528/196 |
| 5,786,445 A | 7/1998 | Wulff et al. | ..................... | 529/500 |
| 5,932,691 A * | 8/1999 | Khanin et al. | ................. | 528/483 |
| 6,129,873 A * | 10/2000 | Shelby et al. | .................. | 264/102 |
| 6,369,192 B1 * | 4/2002 | Dufresne et al. | .............. | 528/483 |
| 6,417,257 B1 * | 7/2002 | Katayama et al. | ............. | 524/141 |
| 6,613,128 B1 * | 9/2003 | Simonaru et al. | ................ | 95/260 |
| 6,811,294 B1 * | 11/2004 | Elsner et al. | ..................... | 366/75 |
| 2005/0121817 A1 * | 6/2005 | Konig et al. | .................. | 264/101 |

* cited by examiner

Primary Examiner — Jeffrey Wollschlager

(74) Attorney, Agent, or Firm — Baker Donelson Bearman Caldwell & Berkowitz, PC

(57) ABSTRACT

A compounding process is disclosed. The process includes (i) melt blending in an extruder at least two polymeric resins to produce a mixture that includes at least one resin that dissociates to yield monomers and/or oligomers upon heating, said mixture containing less than 1 percent of volatile components, (ii) introducing into said extruder an inert entraining agent, and (iii) removing said entraining agent together with said volatile components from said extruder. The extruder includes at least one melting zone, at least two degassing zones and at least one mixing zone. The end product has a particularly low content of residual solvent and at the same time a low content of monomers or oligomers.

15 Claims, 1 Drawing Sheet

US 8,034,269 B2

PROCESS FOR THE COMPOUNDING OF POLYMERS

FIELD OF THE INVENTION

The invention relates to a process and in particular to compounding of polymers.

BACKGROUND OF THE INVENTION

In polymer preparation, the production of the finished plastic molding composition, the compound, from the plastic raw materials with addition of fillers and reinforcing agents, plasticizers, coupling agents, lubricants, stabilizers etc. is termed compounding. Compounding takes place predominantly in extruders and comprises the process operations delivery, melting, dispersing, mixing, degassing and pressure build-up.

More recently, as low as possible a content of volatile components has been required in plastic mixtures. Degassing in the compounding of plastic raw materials is therefore increasingly important. Typically the level of volatile components to be degassed in the plastic raw materials is approximately 500 to 2000 ppm and the residual content in the finished compound less than 400 ppm.

In temperature-sensitive polymers or polymer blends, during the compounding process, apart from the residual monomers and solvents to be degassed which are already contained in the raw materials, monomers can also be formed by disassociation, for example with rubber-modified polycarbonate blends these are 1,3-butadiene and acrylonitrile. The disassociation kinetics is highly temperature-dependant, i.e. as the temperature rises disassociation increases over-proportionately. The difficulty in compounding is that for an effective degassing of the volatile components apart from a low pressure a high temperature is required, but at a high temperature disassociation at the same time greatly increases. In addition, it is made worse that with a reduction of the energy input to reduce the temperature and avoid disassociation, problems can occur with melting and blending of the compound components which has a negative effect on the product quality (i.e. the mechanical properties and the composition). This applies in particular at high throughput rates, thus short dwell times which are required for an economic compounding process. With a higher throughput, a good degassing of the volatile components is only economically achievable with the previous technology if at the same time an increase in the disassociation components is accepted.

The use of entraining agents in extruders is in fact known, though only of the degassing of polymer solutions with a solvent content greater than 1%. However, no simultaneous melting of solid components takes place because the polymer solution is added liquid and without additional dispersion of blend components and additives. While DE 199 14 143 A1 includes relevant disclosure no reference is made to the problematic disassociation of monomers (or oligomers). A process for the drying of polymer powders in which volatile constituents with a content of at least 1 wt. % are removed with melting of the polymer and optionally using an entraining agent, is also known from EP 0 768 157 A1. This technique is restricted to large-volume equipment and deals with the drying of certain polymers having high solvent-content. A use of entraining agents in the compounding of polymers with extruders, in particular of polycarbonate blends, is not known.

The present invention is directed to a process for producing temperature-sensitive polymer compounds having low residual content of volatile and disassociation components. In particular the process is directed to the production of rubber-modified polycarbonate blends.

SUMMARY OF THE INVENTION

Figure 1:
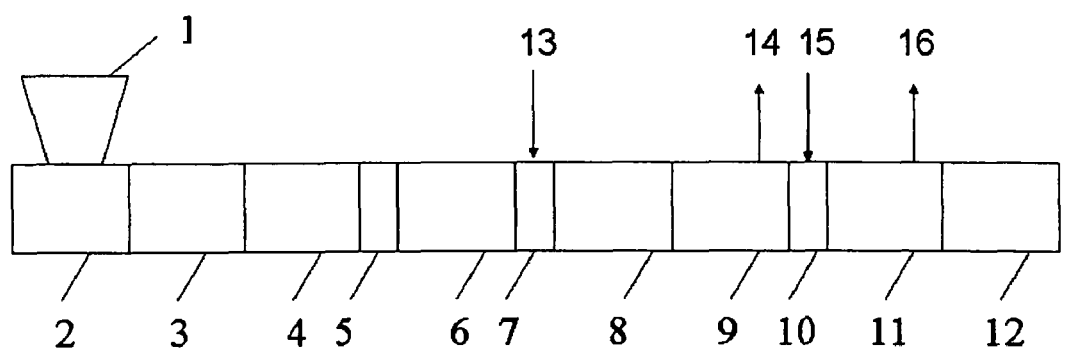
FIG. 1 is a schematic representation of a twin-screw extruder for using the process according to the invention.

A compounding process is disclosed. The process includes (i) melt blending in an extruder at least two polymeric resins to produce a mixture that includes at least one resin that dissociates to yield monomers and/or oligomers upon heating, said mixture containing less than 1 percent of volatile components, (ii) introducing into said extruder an inert entraining agent, and (iii) removing said entraining agent together with said volatile components from said extruder. The extruder includes at least one melting zone, at least two degassing zones and at least one mixing zone. The end product has a particularly low content of residual solvent and at the same time a low content of monomers or oligomers.

DETAILED DESCRIPTION OF THE INVENTION

Accordingly degassing in the course of compounding in an extruder is improved by incorporating an entraining agent, in particular nitrogen. The screw charge for incorporating the entraining agent can be effected in particular so that despite the mixing zones for the entraining agent additionally required compared with conventional screw charges which cause an additional energy input, only a slight increase in the melt temperature results and consequently disassociation is not higher than with conventional compounding processes.

The inventive process enables compounding of at least two polymers having initial total content of residual volatile compounds, based on the composition of the end product, of <1 wt. %, preferably at most 0.1 wt. %, wherein at least one of said polymers disassociates monomers or oligomers (collectively and individually referred to below as "volatiles components") on exposure to heat, the process is carried out in an extruder in which the polymers are mixed, melted and freed of volatile components, characterized in that
  (i) the extruder has at least one melting zone, at least two, preferably two to four, particularly preferably two degassing zones and at least one, preferably one to two, particularly preferably two mixing zones at which point the entraining agent is introduced and
  (ii) degassing takes place using an inert entraining agent which is introduced into the polymer melt and is removed from the extruder together with the volatile compounds.

Preferably the extruder furthermore has a metering zone.

In a preferred embodiment, the entraining agent is removed from the extruder together with the volatile compounds by applying a reduced pressure $p_{abs}$ of less than 500 mbar, particularly preferably of less than 100 mbar.

Nitrogen, noble gas or carbon dioxide is preferably used as the entraining agent, particularly preferably nitrogen.

Under "exposure to heat" of at least one of said polymers a temperature is understood which is the typical temperature of said polymers in the melt during blending. This temperature depends on the nature of said polymer or polymer mixture and is know to the person skilled in the art. Generally such temperatures are in a range up to 400° C. In case of a combination of acrylonitrile-butadiene-styrene graft copolymers (ABS)

and polycarbonate under "exposure to heat" a temperature of 240° C. to 310° C., preferably 270° C. to 300° C. is understood.

In a preferred embodiment of the process according to the invention, thermoplastic polymers are used as polymers, particularly preferably at least one polymer selected from a first group (referred to in the following as "disassociation polymers") consisting of polystyrene, polystyrene copolymers or polystyrene graft copolymers, polyacrylates, polyalkylene and polyamide and at least one polymer selected from a second group (referred to in the following as "non-disassociation polymers") consisting of polycarbonate, polyester carbonate and polyalkylene terephthalate; a combination of acrylonitrile-butadiene-styrene graft copolymers (ABS) and polycarbonate is particularly preferably used.

In another embodiment of the process according to the invention, at least two polymers selected from the group of disassociation polymers consisting of polystyrene, polystyrene copolymers and polystyrene graft copolymers, polyacrylates and polyalkylene are used; a combination of acrylonitrile-butadiene-styrene graft copolymers and polyamide is particularly preferably used.

In both named embodiments, preferably disassociation polymers are selected from the group consisting of acrylonitrile-butadiene-styrene graft copolymers (ABS), polymethyl methacrylate and polypropylene.

The mixing ratio of two polymer components in a preferred process is between the monomer disassociation polymer and the other, non-disassociation polymer 1 to 10 to 2 to 1.

A process which is characterized in that a twin- or multi-shaft screw extruder, in particular a twin-shaft screw extruder, is also preferably used. The screw extruder is particularly preferably a twin-shaft screw extruder with co-rotation of the shafts.

With a compounding process with conventional technology, a degassing efficiency of less than 58% is achievable for example for a polycarbonate/ABS blend with approx. 50% polycarbonate content, without the residual content of disassociation 1,3-butadiene in each case exceeding the maximum desired value. Surprisingly, with the process according to the invention, a degassing efficiency of 68% may be achieved for the same polymer blend at the same throughput with even lower disassociation (cf Tables 2 and 3). Were it desired to achieve a degassing efficiency of 68% with conventional technology, the residual content of disassociation 1,3-butadiene would rise by approx. 300%.

The extruder to be used particularly preferably has a length/diameter ratio of the screw shaft of 32 to 44. The best results were achieved with a length/diameter ratio of 36.

According to a particularly preferred form, the extruder has at least one melting zone, one to two degassing zones, one to two mixing zones for the entraining agent and a metering zone.

The best result was achieved according to a particularly preferred process with a quantity of entraining agent of 0.1% to 0.5% based on the total throughput of starting materials.

According to a further preferred form of the process, the mixing zones at which point the entraining agent is introduced are filled with melt.

Very good results were also achieved according to a further preferred process with addition of entraining agent in melt-filled screw sections directly into the mixing zone or directly before the mixing zone of the screw.

Screw elements which produce a frequent rearrangement of the melt streams and a wide dwell time distribution are preferred for incorporation of the entraining agent. Very good results were achieved with toothed mixing elements. In addition, screw mixing elements, kneading blocks, eccentric disks, return elements etc. for example may be used for incorporating the entraining agent.

The invention therefore is also the following improvement:

In the process of removing volatile components by means of an inert entraining agent from a mixture that includes a polymer resin that dissociate on thermal exposure to yield monomers and/or oligomers, to produce a mixture that containing less than 1 percent by weight, preferably less than 0.1, particularly preferably less than 0.05 percent by weight of volatile components (especially 1,3-butadiene, acrylonitrile, styrene, 4-vinyl-1-cyclohexene, ethylbenzene, chlorobenzene; determined by means of headspace gas chromatography) the improvement comprising (i) melt blending said mixture in an extruder that includes at least one melting zone, at least two degassing zones and at least one mixing zone and (ii) introducing said agent to said mixture through said mixing zone.

The invention is explained in greater detail below by means of a drawing showing an exemplary embodiment. FIG. 1 shows a schematic longitudinal sectional representation of a twin-screw extruder for using the process according to the invention.

EXAMPLES

Referring to FIG. 1, the twin-screw extruder had a housing consisting of 11 parts in which 2 co-rotating intermeshing shafts (not shown) are arranged. The components to be compounded were fed to the extruder via the intake opening 1 formed in housing part 2. Housing parts 9 and 11 contained in each case a vent opening 14, 16 which was connected to an exhausting device (not shown). Housing parts 7 and 10 were equipped with in each case a connection 13, 15 via which the entraining agent nitrogen was added.

The last housing part 12 formed a metering zone at the end of which the compounded and degassed product left the extruder.

In the area of housing parts 4 to 6 was a melting zone with kneading elements of the screw shaft.

In the area of housing parts 7 and 10, mixing elements were arranged between the delivery elements of the screw shaft.

In the area of housing parts 9 and 11 beneath the vent openings 14, 16, the pitch was in each case greater than the external diameter of the screw.

Housing parts 3 and 8 contained in each case delivery zones for the granulate (3) or for the melt (8).

The residual content of volatile components (1,3-butadiene, acrylonitrile, styrene, 4-vinyl-1-cyclohexene, ethylbenzene, chlorobenzene) was determined by means of headspace gas chromatography. A sample of the material was dissolved in γ-butyrolactone and analysed by headspace gas chromatography. A flame ionization detector was used as detector. Quantitative evaluation was carried out using an internal standard. The operating range of the method was dependent on the relevant substance and was in the range of 0.1-500 mg/kg. The limit of detection for 1,3-butadiene was 0.1 mg/kg; for the other substances, the limit of detection was 5 mg/kg.

The number of unmelted particles in 50 granulates was determined by examining 50 granulate particles (dimensions approx. 3 mm×3 mm×3 mm) using a microscope on unmelted particles of the starting material and the particles found were counted.

Example 1

Reference

Compounding of polycarbonate (PC) and acrylonitrile-butadiene-styrene graft copolymer (ABS) (approx. 50 wt. % PC content; PC type: Makrolon 2600, manufacturer Bayer MaterialScience AG; ABS, type: emulsion ABS with approx. 1000 ppm residual monomers) with an input concentration of volatile compounds of 660 ppm takes place first of all on a twin-shaft screw extruder of the ZSK 120 type (Coperion Werner & Pfleiderer) with a conventional process according to the prior art, i.e. without addition of entraining agent.

All polymer components and additives (release agents, heat stabilizers, antioxidants) were fed into the feed hopper in the first part of the housing. The melt was degassed in the penultimate part of the housing. The process parameters and residual contents are shown in the following table. In case of all examples the temperature of the melt when leaving the extruder was approx. 300° C.

TABLE 1

| | | | Residual content | | |
|---|---|---|---|---|---|
| Through put kg/h | revolutions per minute l/min | Pressure mbar | Sum of all volatile constituents ppm | 1,3-butadiene ppm | Degassing efficiency % |
| 1700 | 250 | 110 | 343 | 0.4 | 48 |

A degassing efficiency of 48% only was achieved at the above-mentioned throughput.

The degassing efficiency was calculated according to the following formula:

$$\frac{\Sigma \text{ residual contents}_{input} - \Sigma \text{ residual contents}_{output}}{\Sigma \text{ residual contents}_{input}} \cdot 100\%$$

Example 2

Reference

Compounding of PC/ABS (approx. 50% PC content) took place as in Example 1 with an input concentration of volatile constituents of 660 ppm on a ZSK 58Mc (Coperion Werner & Pfleiderer) with the current conventional process.

All components were fed into the feed hopper in the first housing. The melt was degassed in the penultimate housing. Two series of tests were carried out:

1st series of tests: variation of the speed

2nd series of tests: variation of the degassing pressure

The process parameters and residual contents are shown in the following table.

TABLE 2

| | | | Residual content | | | |
|---|---|---|---|---|---|---|
| Through put kg/h | revolutions per minute l/min | Pressure mbar | Sum of all volatile constituents ppm | 1,3-butadiene ppm | Degassing efficiency % | Specific energy input kWh/kg |
| *1st series of tests* | | | | | | |
| 1000 | 550 | 50 | 376.2 | 0.2 | 43 | 0.129 |
| 1000 | 720 | 50 | 315.3 | 0.3 | 53 | 0.139 |
| 1000 | 920 | 50 | 273.15 | 0.7 | 59 | 0.149 |
| 1000 | 1000 | 50 | 278.8 | 0.8 | 58 | 0.151 |
| 1160 | 1200 | 50 | 259.1 | 1.1 | 61 | 0.154 |
| *2nd series of tests* | | | | | | |
| 1000 | 720 | 100 | 305.2 | 0.2 | 54 | 0.135 |
| 1000 | 720 | 50 | 298.3 | 0.3 | 55 | 0.134 |
| 1000 | 720 | 9 | 307.2 | 0.2 | 54 | 0.138 |
| 800 | 540 | 100 | 350.2 | 0.2 | 47 | 0.129 |
| 800 | 540 | 45 | 316.2 | 0.2 | 52 | 0.128 |
| 800 | 540 | 8 | 293.2 | 0.2 | 56 | 0.127 |

Results:

1st series of tests: With a rise in speed, which is tantamount to a rise in energy input, the sum of all residual contents of volatile compounds fell, although the content of disassociated 1,3-butadiene at the same time rose above 1 ppm. The maximum degassing efficiency at which a 1,3-butadiene content of less than 1 ppm was still achieved, was 59%.

2nd series of tests: With a reduction in the vacuum, no rise in the degassing efficiency compared with the 1st series of tests could be achieved.

In addition, in the end product of the 1st and 2nd series of tests there were between 18 and 44 large unmelted polymer particles in 50 granulates.

Example 3

Reference with 2 Degassing Zones

Compounding of PC/ABS (approx. 50% PC content; components as in Example 1) with an input concentration of volatile compounds of 990 ppm took place on a twin-shaft screw extruder type ZSK 32Mc (Coperion Werner & Pfleiderer) with vacuum degassing at two points after the melting zone.

All polymer components and additives (release agents, heat stabilizers, antioxidants) were fed into the feed hopper in the first housing. The process parameters and residual contents are shown in the following Table 3.

TABLE 3

| Through-put kg/h | Revolutions per minute l/min | Pressure 1 mbar | Pressure 2 mbar | Residual content Sum of all volatile constituents ppm | 1,3-butadiene ppm | Degassing efficiency % | Specific energy input kWh/kg | Number of unmelted particles in 50 granulates |
|---|---|---|---|---|---|---|---|---|
| 168.5 | 600 | 54 | 57 | 428.6 | 0.6 | 56.7 | 0.135 | 4 |

Result:

No increase in the degassing efficiency could be achieved with two degassing zones.

Example 4

Reference with 1 Degassing Zone and 1 Entrainer Gas Feed

Compounding of PC/ABS (approx. 50% PC content; components as in Example 1) with an input concentration of volatile compounds of 990 ppm took place on a twin-shaft screw extruder type ZSK 32Mc (Coperion Werner & Pfleiderer) with vacuum degassing and an entrainer gas feed, the entrainer gas feed into the polymer melt taking place before degassing.

All polymer components and additives (release agent, heat stabilizers, antioxidants) were fed into the feed hopper in the first housing. The process parameters and residual contents are shown in the following Table 4.

Result:

The degassing efficiency could be improved in comparison to Examples 1 to 3 with at the same time low 1,3-butadiene residual content. However, there were still 4-11 unmelted particles in 50 granulates.

Example 5

Result:

According to the Invention; with 2 Degassing Zones and 1 Entrainer Gas Feed

Compounding of PC/ABS (approx. 50% PC content; components as in Example 1) with an input concentration of volatile compounds of 990 ppm took place on a twin-shaft screw extruder type ZSK 32Mc (Coperion Werner & Pfleiderer) with twice vacuum degassing and an entrainer gas feed into the polymer melt, the entrainer gas feed taking place between the two degassing zones.

All polymer components and additives (release agents, heat stabilizers, antioxidants) were fed into the feed hopper in the first housing. The process parameters and residual contents are shown in the following Table 5.

TABLE 4

| Through put kg/h | Revolutions per minute l/min | Nitrogen % | Pressure mbar | Residual content Sum of all volatile constituents ppm | 1,3-butadiene ppm | Degassing efficiency % | Specific energy input kWh/kg | Number of unmelted particles in 50 granulates |
|---|---|---|---|---|---|---|---|---|
| 168.5 | 600 | 0.5 | 57 | 358.5 | 0.5 | 63.8 | 0.136 | 4 |
| 168.5 | 600 | 1 | 53 | 352.5 | 0.5 | 64.4 | 0.136 | 11 |
| 168.5 | 600 | 1.3 | 53 | 371.5 | 0.5 | 62.5 | 0.135 | 4 |

TABLE 5

| Through-put kg/h | Revolutions per minute> l/min | Nitrogen % | Pressure 1 mbar | Pressure 2 mbar | Residual content Sum of all volatile constituents ppm | 1,3-butadiene ppm | Degassing efficiency % | Specific. energy input kWh/kg | Number of unmelted particles in 50 granulates |
|---|---|---|---|---|---|---|---|---|---|
| 168.5 | 600 | 0.5 | 53 | 54 | 291.5 | 0.5 | 70.5 | 0.133 | 8 |
| 168.5 | 600 | 1 | 50 | 51 | 307 | 0.5 | 69 | 0.136 | 4 |
| 168.5 | 600 | 1.3 | 52 | 53 | 310 | 0.5 | 68.7 | 0.135 | 8 |

Result:

The degassing efficiency could be improved in comparison to Examples 1 to 4 with at the same time low 1,3-butadiene residual content. However, there were still 4-8 unmelted particles in 50 granulates.

Example 6

According to the Invention, with 2 Degassing Zones and 2 Entrainer Gas Feeds

Compounding of PC/ABS (approx. 50% PC content; components as in Example 1) with an input concentration of volatile compounds of 671 ppm took place on a modified twin-shaft screw extruder type ZSK 32Mc (Coperion Werner & Pfleiderer) with the entrainer gas feed according to the invention (see FIG. 1).

All polymer components and additives (release agents, heat stabilizers, antioxidants) were fed into the feed hopper in the first housing. 0.5% nitrogen, based on 168.5 kg/h of the starting materials, was fed into the melt at two points. The process parameters and residual contents are shown in the following Table 6.

A compound with very low residual content of volatile compounds and good mechanical and rheological properties was produced with the process according to the invention according to Claim 6. The degassing efficiency was 68.2% with at the same time very low 1,3-butadiene content (0.6 ppm).

With a throughput of 168.5 kg/h (this corresponds scaled high to a throughput which is currently used on a twin-screw extruder with the same torque density with conventional processes), only one single unmelted particle was found in 50 granulates.

TABLE 6

| Through-put kg/h | revolutions per minute l/min | Nitrogen 1 % | Nitrogen 2 % | Pressure 1 mbar | Pressure 2 mbar | Residual content Sum of all volatile constituents ppm | 1,3-butadiene ppm | Degassing efficiency % | Specific energy input kWh/kg | Number of unmelted particles in 50 granules |
|---|---|---|---|---|---|---|---|---|---|---|
| 168.5 | 600 | 0.5 | 0.5 | 55 | 50 | 213.6 | 0.6 | 68.2 | 0.138 | 1 |

$$\frac{\sum residual\ contents_{input} - \sum residual\ contents_{output}}{\sum residual\ contents_{input}} \cdot 100\% = degassing\ efficiency$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compounding process comprising
   (i) melt blending in an extruder at least two polymeric resins comprising acrylonitrile-butadiene-styrene graft copolymer and polycarbonate to produce a mixture that includes at least one resin that dissociates to yield monomers and/or oligomers upon heating, said mixture containing initially less than 1 percent of volatile components,
   (ii) introducing into said mixture an inert entraining agent
   (iii) removing said entraining agent together with said volatile components from said mixture, wherein the degassing efficiency of the process, calculated according to the formula is at least 68%, the entraining agent is introduced at an amount of 0.1 to 0.5% based on the total weight of said polymeric resins, and
   wherein the extruder includes at least one melting zone, at least two degassing zones and at least one mixing zone.

2. The process of claim 1 wherein the removing is carried out by applying reduced pressure of less than 500 mbar.

3. The process of claim 1 wherein said resin that dissociates upon heating is acrylonitrile-butadiene-styrene graft copolymer.

4. The process of claim 1 wherein said mixture contains at least two polymers that dissociate.

5. The process of claim 1 wherein the at least one resin that dissociates is present in the mixture in an amount of 10 to 66% relative to the weight of the mixture.

6. The process of claim 1 where at least one of (ii) and (iii) takes place in more than one stage.

7. The process of claim 1 wherein the extruder is a twin screw extruder.

8. The process of claim 7 wherein the twin-shaft screw extruder includes co-rotation of the shafts.

9. The process of claim 1 wherein the extruder has a ratio of length to diameter of the screw shaft is 32-44.

10. The process of claim 1 wherein said extruder further includes a metering zone.

11. The process of claim 1 wherein said extruder includes two mixing zones and a metering zone.

12. The process of claim 1, wherein the resulting blend has less than 0.1 percent by weight of volatile components, said percent relative to the weight of said resins.

13. The process of claim 1 wherein the entraining agent is selected from the group consisting of nitrogen, noble gas, and carbon dioxide.

14. The process of claim 1 wherein the residual content of 1,3-butadiene in the resulting blend is less than 0.6 ppm relative to the weight of said resins.

15. A compounding process comprising
   (i) melt blending in an extruder at least two polymeric resins comprising acrylonitrile-butadiene-styrene graft copolymer and polycarbonate to produce a mixture that includes at least one resin that dissociates to yield monomers and/or oligomers upon heating, said mixture containing initially less than 1 percent of volatile components,
   (ii) introducing into said mixture an inert entraining agent selected from the group consisting of nitrogen, noble gas and carbon dioxide, and (iii) removing said entraining agent together with said volatile components from said mixture, wherein the resulting blend has less than 0.1 percent by weight of volatile components, and wherein the extruder includes at least one melting zone, at least two degassing zones and at least one mixing zone, said percent relative to the weight of said resins, and wherein said resin that dissociates upon heating is an acrylonitrile-butadiene-styrene graft copolymer, and wherein the degassing efficiency of the process, calculated according to the formula $$\frac{\sum residual\ contents_{input} - \sum residual\ contents_{output}}{\sum residual\ contents_{input}} \cdot 100\% = degassing\ efficiency$$

is at least 68%, the entraining agent is introduced at an amount of 0.1 to 0.5% based on the total weight of said polymeric resins.

\* \* \* \* \*